Oct. 23, 1956 A. F. BOFF 2,768,299

HARMONIC SPECTRUM GENERATOR

Filed Oct. 28, 1954

INVENTOR.
ALBERT FRANK BOFF

BY
Lippincott & Smith
ATTORNEYS

United States Patent Office 2,768,299

Patented Oct. 23, 1956

2,768,299

HARMONIC SPECTRUM GENERATOR

Albert Frank Boff, Richmond, Calif., assignor to Beckman Instruments, Inc., South Pasadena, Calif., a corporation of California Application October 28, 1954, Serial No. 465,265

1 Claim. (Cl. 250—36)

Figures 1, 2:
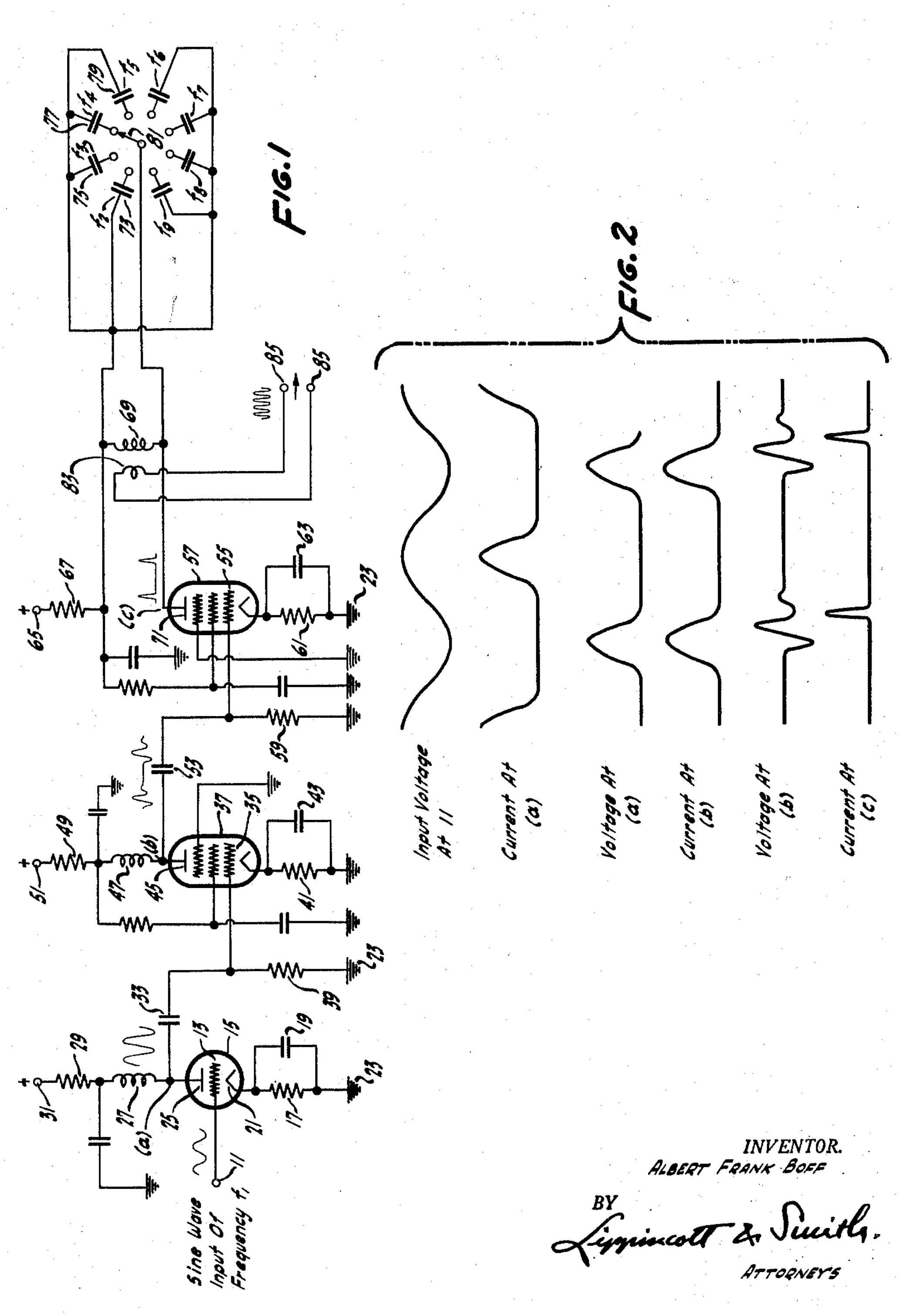

This invention relates to an harmonic spectrum generator particularly, although not necessarily, useful in the measurement and presentation in digital form of frequencies varying from very low values through to and including extremely high values.

Through the use of the present invention as a part of a frequency metering or measuring component, it is possible to obtain precise frequency measurements which may be considered as accurate to the order of about one part in 10,000,000 plus or minus one count without the need of extremely complex circuitry. In its essence the present invention utilizes a stable frequency generator in combination with harmonic selector means by which frequencies of any harmonic throughout any desired range are obtainable, utilizing the initially generated constant frequency as the reference base.

For the development and obtainment of a measure of frequency values considered illustratively in the range between substantially zero frequency or direct current, and frequencies of the order of 50 megacycles, it may be assumed that the generated reference frequency occurs at a frequency value stabilized by any suitable crystal control, for instance. The developed frequency may be of a value of the order of one megacycle. Through the use of appropriate controls and suitable gating circuits selection of any harmonic of the one megacycle standard frequency within a range of, illustratively, between two (2) megacycles to fifty (50) megacycles may be obtained.

In practicing the invention according to a preferred form, a suitable sine wave oscillation of a desired frequency, illustratively assumed as one (1) megacycle is developed and generated by any suitable source of high frequency stability, such as a crystal controlled vacuum-tube oscillator. The amplitude of the oscillations in the generating circuit is controlled in any desired manner, such as by an automatic control of the positive feedback. The generated frequency which may be supplied to any sort of an appropriate translating element illustratively in the form of a thermionic device, or, for instance, a transistor, is suitably amplified to a desired value. The resultant wave of the fundamental frequency selected is then impressed upon an appropriate form of gating or trigger circuit which is normally self-biased in such fashion that only the peak voltage in one direction of the amplified oscillatory energy is capable of opening or triggering the gating mechanism. With opening of the gate, shock excitations which occur at an harmonic of the impressed wave are developed in an oscillatory circuit associated with the gate output. The developed oscillatory waveform resulting is suitably damped to a greatly reduced amplitude from the maximum within the time period between successive gate openings, as controlled by the impressed and stabilized frequency wave. The voltage waveform developed in the output is substantially steepened with respect to the initially developed wave.

The steep wavefront is then applied to open a second gate which is normally self-biased to a closed or inoperative state. In this control the first positive going overshoot is adequate to overcome the normal bias on the second gate and causes a large current pulse to flow in the plate circuit of the tube. There is arranged to be energized in accordance with current flow in the plate circuit of this second gate, a suitable low loss coil which is tuned by various capacitors, adapted to be selected, for instance, by a turret switch, to various frequencies in the spectrum over which controlled frequency and suitably phased oscillations or pulses are required to be developed. In the form in which the invention will be illustrated these frequencies may be assumed to be harmonically related to the initially developed frequency, herein assumed at one megacycle, and the harmonics may be as being in the range of between 2 and 50 megacycles, for instance. The low loss inductor which is tuned by the capacitors and which is shock excited to a ringing state by the current pulse flowing through the second gate, has a very high-Q which is maintained over the entire frequency spectrum, so that the tuned circuit extracts the proper frequency component from the supplied control pulse. A single turn coupling loop, which connects to a suitable load circuit, preferably couples a small amount of energy to an appropriate mixing circuit in which the generated and selected frequency is appropriately mixed with an unknown input frequency.

The pulse generator of the character herein to be described is one which is formed with the general objectives in mind of providing a high speed, high level output current pulse having frequency components extending even beyond the 50th harmonic of the fundamental exciting frequency so as to provide the desired uniformity of response throughout a wide frequency spectrum.

A further objective to be realized by the present invention is that of providing a repetition rate of recurrence of a phenomena, which is accurately controlled by a master oscillator without so-called phase "jitter" or modulation, and also to provide for the development of pulse energy at an harmonic of a suitably stabilized control wave where the developed pulses are insensitive to circuit adjustments or operating parameters of tubes or other operating components.

Further objectives of the invention are to provide by a reduced minimum of tubes and other operating components for the development of pulses of controlled frequency energy occurring within a wide spectrum and which can be suitably controlled from a desired stabilized oscillator.

Other objects of the invention will become apparent to those skilled in the art to which it is directed is considered in connection with the following description and the accompanyng drawings, wherein:

Fig. 1 illustratively presents one form of the invention in simplified circuit representation; and, Fig. 2 constitutes a series of curves to illustrate a preferred operation of the circuit shown by Fig. 1.

Considering now the drawings and first Fig. 1 thereof, sine wave energy accurately controlled as to frequency and which may occur at a suitable fundamental frequency of $f_1$ illustratively assumed, for instance, to be a value of one megacycle, is supplied at an input terminal 11, from which it is impressed upon the grid or control electrode 13 of a suitable thermionic translating device 15. The tube 15 previously has its bias set by an appropriate resistor 17 by-passed in known manner by the condenser 19, with the parallel combination of the resistor and the condenser connected between the tube cathode 21 and ground 23. The anode or plate 25 of the tube connects through inductance element 27 and a resistor 29 to a suitable source of operating voltage schematically indicated as connected to the terminal 31. The tube 15, as provided, develops high gain and acts as an amplifier for the sine wave input energy impressed at the input terminal 11. Illustratively, the input wave assumed to be impressed at the input terminal 11 is exemplified in schematic fashion by the first curve of Fig. 2 and it will be seen that the current wave form available at the output or plate of the tube 15 (shown at point *a*) schematically is represented by the second curve of Fig. 2. The voltage available at the same point is designated by the third schematic curve of Fig. 2. In this form it will be appreciated that the inductance 27 constitutes the plate load of the tube and is essentially a low loss inductor and resonates with a stray circuit capacitance at a frequency generally of the order of that of the fundamental frequency available at the input terminal 11, and at a frequency which does not usually exceed the second harmonic of the impressed frequency.

The amplified output wave derived as the output of the tube 15 is then supplied through a capacitor 33 upon the grid 35 of the tube 37. The tube 37 functions as a gate and during periods of operation normally draws grid current so that the condenser or capacitor 33 is thereby charged to a voltage which serves normally to bias the tube 37 to an inoperative or non-conducting state. The grid leak resistor 39, which connects to ground 23 at one end and to the condenser 33 and grid 35 at the other end provides a leak for the charge on the capacitor 33. The time constant of this resistor-condenser combination is normally long with respect to the frequency of the impressed pulses so that the bias holds upon the tube 37.

The tube 37 also has its cathode biased by a resistor, shown at 41, appropriately by-passed by the capacitor 43. The normal connections are provided for the number 2 and number 3 grids and at the anode or plate 45 there is connected an inductor 47 which, in turn, connects through the resistor 49 to a suitable terminal point 51 whereat positive operating voltage is supplied. Thus, the plate load of the tube 37 is in the form of a resistance in series with a low loss inductor element 47, which is self-oscillatory upon excitation at a frequency in the general range of between 7 and 10 times that of the fundamental of the oscillatory frequency impressed upon the terminal point 11. This oscillatory circuit is normally relatively highly damped so that the amplitude of the oscillations developed is substantially reduced following initial excitation to a point where an amplitude is negligible at the time each exciting pulse is applied to the grid 35 to cause current flow through the tube 37.

With current flowing through the tube 37, the potential at the plate end of the inductor 47 initially decreases, as is illustrated particularly by the fifth curve of Fig. 2 showing the voltage at point *b* and further exemplified by the waveform adjacent to the diagram of Fig. 1 appearing immediately above the coupling condenser 53. The current waveform at the output or plate 45 is diagrammatically shown by the fourth curve from the top of Fig. 2. For this form of operation the initial flow of current through the tube 37 as exemplified by the last-mentioned curve of Fig. 2, causes the voltage available at the plate to decrease and as soon as current flow through the tube is interrupted and the inductor has been shock excited, the voltage at the plate end of the inductor 47 immediately rises so that the oscillatory combination of the inductor 47 (tuned by the stray capacity) goes through one cycle of oscillation. Successive cycles of oscillation decrease in amplitude due to the high damping. From this it will be seen that the positive peak of the waveform occurs during an inoperative period of the tube 37. This waveform likewise is considerably steeper than the impressed waveform available at the terminal 11 because of the fact that the tube 37 draws current only at the peaks of the amplified output of the tube 15 and further, because the circuit resonates at a frequency higher than the initially impressed frequency available at terminal 11. That voltage wave which is available at the plate end of the inductor 47 (represented at point *b*) due to the produced oscillations is then supplied through the coupling capacitor 53 to the grid 55 of a second gating or trigger tube 57.

Tube 57, like tube 37, functions essentially as a switch or a gate to inject a burst of energy into its plate circuit. At time intervals controlled by the preceding stage, at each time tube draws plate current, grid current also flows in the tube and the capacitor 53 is charged to a polarity which tends to cut off tube operation in the absence of any impressed voltage pulse which serves to overcome this biasing potential. The grid leak 59 connected at one end to the tube grid and to the condenser 53, and at its other end to ground, serves with the capacitor 53 to provide a time constant which is likewise long with respect to the time period of each successive cycle of the impressed fundamental frequency *f*, at the input terminal 11. Consequently, with the magnitude of the biasing voltage to which the condenser 53 is charged being such that only the first positive peak of the voltage available at the plate of the tube 37 is sufficient to render the tube 57 conducting, it will be appreciated that only during extremely short part of the time period of successive cycles of the input wave energy available at the terminal 11 can the tube 57 draw current.

The tube 57 has its cathode biased by resistor 61 appropriately by-passed by the condenser 63. Plate or anode voltage for the tube 57 is supplied at a terminal point 65 through a resistor 67 and the low loss coil 69 to the anode or plate element 71. The coil 69 forms one component of a resonant circuit which may be tuned by appropriately connected capacitor elements schematically represented at 73, 75, 77, 79, and so on, which are connected individually in shunt to the coil 69 by way of the schematically represented turret switch 81, the armature of which is adapted to contact one terminal of the individual capacitor. The opposite terminal of each capacitor 73, 75, 77 and so on is connected to the end of the coil 69 opposite that to which the armature of the turret switch 81 is connected.

By appropriately selecting one of the capacity elements 73, 75, 77, and so on, it is possible to cause the circuit comprising the low loss coil 69 and one of the capacitor elements to resonate at any desired frequency in the range between the fundamental supplied at the input terminal 11, for instance, and, for instance, fifty (50) times that frequency supplied at the input terminal 11.

The representation of the turret switch 81 and the various capacitors there shown is intended to be schematic and indicative of only a few of the total number of capacitor elements which would normally be supplied to be connected individually across the low loss coil 69 for developing a wide range of selectable frequencies.

The circuit formed by the low loss coil 69 and the instantly selected capacitor is designed to have a very high "Q." The tuned circuit in its excitation extracts the proper frequency component from the applied pulse. The developed oscillations result from the ringing effect introduced by the short period over which the tube 57 can draw current as a result of the input voltage received upon its grid 55 overcoming the normal bias thereon. The repetition of the pulses is sufficient to maintain the oscillation in the tuned circuit at the selected frequency substantially undiminished in amplitude. Coupling coil 83 is usually in the form of a single loop only and is intended to couple a small amount of the energy of the oscillatory circuit, comprising the coil 69 and one of the condenser elements, so as to apply this energy as a desired reference frequency at the output terminals 85. In the normal operation, the output terminals 85, as above inferred, lead to the input of a suitable mixer (not shown) to which there is supplied also the unknown frequency. For the purpose of this invention, however, the output terminals 85 may be considered as those to which the various voltages indicative of the particular developed frequency become available.

In the description of this invention the principles have been illustrated by reference to thermionic tubes functioning as an amplifier, as in the case of the tube 15, or as a gate or switch, as in the case of tubes 37 and 57, capable of injecting bursts of energy into the tube plate circuits at time intervals which are controlled by the preceding stage. It is, however, to be understood that the tubes 15, 37 and 57, for instance, functioning as translating elements, may, with appropriate circuit changes, be replaced by the now more or less well known transistor elements. In connection with the oscillatory circuits formed by the coil 69 and various capacitors 73, 75, 77 and so on it will be understood that, if desired, the turret switch may select different inductance values to substitute for coil 69 in establishing different oscillation frequencies, it being understood that for such operation one capacity only will serve for the full frequency range. Likewise, the inductance may be tapped to change the frequency range and, where desired, various frequencies may be generated by changing both inductance and capacity.

Having now described the invention, what is claimed is:

An harmonic spectrum generator comprising means to develop a substantially constant frequency sine waves of a frequency *f*, a first self-biased gating means connected to the frequency source *f* to receive the developed sine waves in the input circuit thereof, the amplitude of the sine wave at substantially the peak of its half cycle in one polarity of oscillation being sufficient to overcome the bias on the said gating means to permit current flow therethrough at such time, a damped oscillatory circuit connected to the output of the gating means to respond to the flow of current in said first gating means to develop damped oscillations, the parameters being such that the damped oscillations occur at a higher frequency than that of the initially developed sine wave at each such period, the amplitude of the crest value of each half cycle of the so developed oscillations decreasing in the period between successive pulsings of the said first gating means, a second self-biased gating means connected to receive the said decreasing amplitude oscillations at its input and to draw current only at substantially the peak of the first half cycle of each pulsing developing oscillation in one direction of the said oscillatory circuit, a high-Q resonant circuit connected to the output of the second gating means to be excited to oscillation at times of current flow in the second gating means, the high-Q resonant circuit comprising a low loss inductance element and shunting capacity means, turret means selectively to change the capacity parameter of the high-Q resonant circuit so that the frequency range of the normal oscillatory frequency includes selected frequencies in the range between *f* and 50*f*, and a loosely coupled inductive circuit coupled to the low loss inductance element to receive energy at the generated frequency of said resonant circuit.

References Cited in the file of this patent

UNITED STATES PATENTS

| | | |
|---|---|---|
| 2,484,763 | Sturm | Oct. 11, 1949 |
| 2,524,677 | O'Brien | Oct. 3, 1950 |